UNITED STATES PATENT OFFICE.

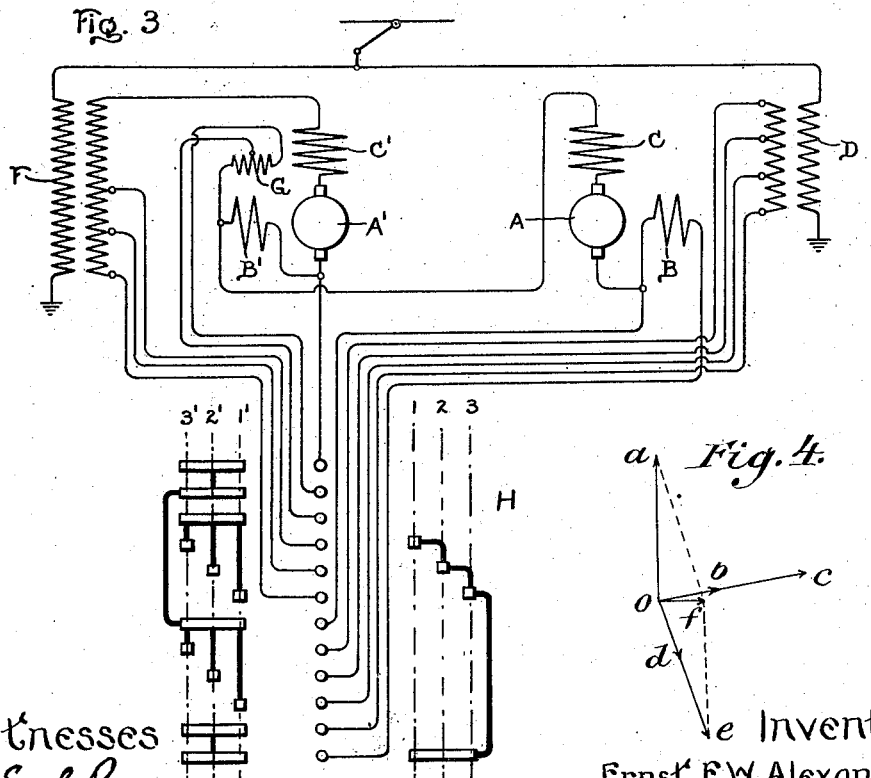

ERNST F. W. ALEXANDERSON, OF SCHENECTADY, NEW YORK, ASSIGNOR TO GENERAL ELECTRIC COMPANY, A CORPORATION OF NEW YORK.

ELECTRIC BRAKING.

967,296.  Specification of Letters Patent.  Patented Aug. 16, 1910.

Application filed February 19, 1908. Serial No. 416,695.

*To all whom it may concern:*

Be it known that I, ERNST F. W. ALEXANDERSON, a citizen of the United States, residing at Schenectady, county of Schenectady, State of New York, have invented certain new and useful Improvements in Electric Braking, of which the following is a specification.

My invention relates to electric braking, and its object is to provide a novel system of motor control adapted to improve the efficiency of electric braking, and to give a more stable condition when the motors are connected as braking generators.

It has been proposed heretofore, in the case of a plurality of series motors connected to drive a common load, to employ one of the motors as a separately-excited generator driven by the load, and to use it to excite the field of another motor, which acts as a braking generator driven by the load to return power to the line.

My invention, in one aspect, consists in superposing on the excitation derived from the first motor an opposing excitation proportional to the current returned to the source. In other words, the motor which returns energy to the source is excited differentially by the current generated in the exciting motor and by the current returned to the source. This differential excitation results in more stable conditions than are otherwise obtainable. For instance, if the motor at a given speed is returning a certain amount of energy to the line and thus acting as a braking generator to decrease the speed, then when the speed falls, the induced voltage of this motor tends to fall, and the current returned to the line tends to decrease; but with the differential excitation which I employ, this decrease of current returned to the source increases the field excitation of the motor or braking generator, so that the effect of the reduced speed on the induced voltage is partly offset. The differential excitation may be obtained by connecting the field winding of the braking generator in whole, or in part, in series with its armature.

My invention, as set forth above, is applicable both to direct-current and to alternating-current motors. When applied to alternating-current motors, however, the inclusion of the exciting winding in the armature circuit results in an advantage in addition to and apart from improving the characteristic of the braking generator. When one alternating-current motor is employed to excite another in the manner above set forth, the phase relations of the currents and voltages in the two motors are as follows: On the exciting winding of the motor which serves as exciter, a voltage is impressed in phase with the voltage of the source.

Since the exciting winding is highly inductive, the exciting current, and consequently the induced voltage in the armature of the motor which serves as an exciter, is substantially in quadrature with the voltage of the source. This induced voltage is impressed on the exciting winding of the motor which serves as a braking generator, and consequently the current in the exciting winding of this latter motor, and, therefore, its induced armature voltage, are in phase with, or rather, in opposition to, the voltage of the source. If, however, the induced voltage of the braking generator is exactly in opposition to the voltage of the source, so that the resultant of these two voltages is itself exactly in opposition to the voltage of the source, no energy will be returned to the source, since the circuit formed by the braking generator and the source is highly inductive, and the current lags nearly ninety degrees behind the voltage. The current that would flow in this case would, therefore, be wattless. In order that energy may be returned to the source, the voltage at the terminals of the braking generator should be nearly, but not quite, in opposition to the voltage of the source, so that the resultant of these two voltages may be approximately ninety degrees out of phase with the voltage of the source. With this condition, the current which is returned to the source is in opposition to the voltage of the source, and is consequently an energy current. The presence of the exciting winding of the braking generator in its armature circuit serves to produce the necessary small phase-displacement between the voltage at the terminals of the braking generator and the voltage of the source.

In many cases the phase-displacement that would be produced if the whole exciting winding were included in the armature circuit of the braking generator would be too great. In such a case a part only of the exciting winding may be included in this circuit, and the connections whereby the exciting winding is included in the armature circuit in part only may be made directly or inductively through a compensator, as will hereinafter be described.

My invention will best be understood by reference to the accompanying drawings, in which—

Figure 1 shows diagrammatically a pair of motors connected for braking electrically, in accordance with my invention; Fig. 2 shows a modification of the same, in which the exciting winding of the braking generator is included only in part in the armature circuit; and Fig. 3 shows diagrammatically a control system for operating the two motors, as motors for driving a load, or as generators for braking electrically; and Fig. 4 is an explanatory diagram.

In the drawings, A and A' represent the armatures, B and B' the exciting windings, and C and C' the compensating windings of a pair of compensated series motors. While my invention is not limited to this particular type of motor, I have selected it for the purpose of illustration, as it is well known in the art. Each compensating winding is connected permanently in series with its armature, and in order to avoid the use of unnecessary words, mention of the compensating windings will hereinafter be omitted; the term "armature" being used to include both armature and compensating windings, if compensating windings are employed.

In the drawings the motor whose armature is represented by A is employed as an exciter, and the motor whose armature is represented by A', for a braking generator. The winding B of the exciter-motor is separately excited by connecting it across a portion of a transformer D connected to the supply mains E E. The voltage impressed on this winding B is consequently in phase with the voltage of the line. The current in winding B, and, therefore, the induced voltage in armature A are substantially in quadrature with the voltage of the source. This voltage is impressed on the exciting winding B' of the other motor. The current in winding B' and the voltage induced in armature A' are, therefore, approximately in phase with, or rather in opposition to the line-voltage. The current which is returned from the armature A' to the line passes through the exciting winding B', since this winding is included in the armature circuit. Since this winding is highly inductive, its presence in the armature circuit results in slightly displacing the phase of the armature voltage from the voltage of the line, so that the resultant of these two voltages is practically at right-angles to the line-voltage. The three voltages might be represented by a right-angle triangle, in which the voltage across the motor terminals is the hypotenuse, the line-voltage is the longer side, and the resultant voltage the shorter side of the triangle. Since the current which is returned to the line is substantially in quadrature with the resultant voltage, it is in opposition to the voltage of the source, or, in other words, is an energy-current. These phase relations will best be understood by reference to Fig. 4, in which $o\,a$ represents the phase of the voltage impressed on the winding B of the motor, which serves as an exciter. The current in this winding is represented by $o\,b$ lagged nearly ninety degrees behind the impressed voltage, and the voltage induced in armature A in phase with the exciting current is represented by $o\,c$. This voltage is impressed on winding B' of the braking generator, and produces in this winding the current $o\,d$, which lags nearly ninety degrees behind the impressed voltage $o\,c$. The voltage induced in armature A' is in phase with the current $o\,d$, and may be represented by $o\,e$, which is displaced nearly but not quite one hundred and eighty degrees from the line voltage $o\,a$. The resultant of the two voltages $o\,a$ and $o\,e$, which represents the voltage drop across the exciting winding B' is represented by $o\,f$, which, with the line voltage $o\,a$ and the voltage $o\,e$ induced in the armature A' of the braking generator, forms a right-angle triangle. The current returned to the line is substantially in quadrature with the resultant voltage $o\,f$ and substantially in phase with the line voltage $o\,a$.

As motors are ordinarily designed, the phase-displacement produced by the presence of the exciting winding B' in the armature circuit may be too great. If this is the case, only a portion of the exciting winding should be included in the armature circuit. If it is not convenient to bring out an intermediate tap from the winding for this purpose, the same result may be obtained by the use of a small compensator connected as shown in Fig. 2. In this figure the motors are supplied from the line through a transformer F, and the connection to this transformer from the armature A', when the motors are connected for braking, is made through a portion of a compensator G, which is connected in shunt to the exciting winding B'. This connection has precisely the same effect electrically as would a connection to the transformer F from an intermediate point on the exciting winding itself, and is in effect connecting the exciting winding in part only in the armature circuit and may be employed when it is not convenient to bring out an intermediate tap on that winding. The braking effect in Fig. 2 may be varied both by varying the amount of the voltage impressed on the exciting winding B of the exciter-motor, and by varying the point of connection of the braking generator or motor to the transformer F. The connections shown in Fig. 2 are those for braking at maximum speed, at which time the minimum voltage is impressed on the exciting winding B, while the braking generator is connected across the whole of the secondary winding of transformer F.

In Fig. 3 is shown diagrammatically a simple control system for the motors with a controlling switch H arranged to connect the motors both as motors and for electric braking. This switch H is shown conventionally with its contacts developed on a plane surface. Three running positions are shown, indicated by the dotted lines 1, 2 and 3, and three braking positions, indicated by dotted lines 1′, 2′ and 3′. When the switch H is moved into one of its running positions, the two motors are connected in series with each other, and to the secondary of transformer F. The only change that is made in moving from one running position to another is varying the amount of the voltage impressed on the motors. It will, of course, be understood that this control is used merely for the purpose of illustration, and forms no part of my invention, and that the braking connections may be employed in combination with any running connections.

In moving to the first braking position 1′, the connections shown in Fig. 2 are established. These connections, as has been said, are those for braking at maximum speed. In moving to position 2′, the voltage impressed on exciting winding B, from transformer D, is increased, and the point of connection from the braking generator to transformer F is shifted so as to connect it across a smaller number of turns. This, in effect, changes the ratio of transformation of the transformer F so as to compensate for the reduction in induced voltage in the motors, due to decreased speed. In passing to position 3′ the voltage impressed on winding B is again increased, and the connections of the braking generator are again varied to connect it across a still smaller number of secondary turns of transformer F. With each of these braking connections the current returned to the source by the braking generator opposes in the exciting winding the current supplied to it by the exciter-motor. The result is to give something of a series character,—that is, to tend to return to the line a constant current with varying speed, as has been heretofore explained; and, therefore, to give a stable braking characteristic.

While for the sake of simplicity I have shown only two motors in the drawings, it will be understood that my invention is applicable to any number of motors arranged to drive a common load, and that any portion of the motors may be used as exciters, and the remaining portion as braking generators.

What I claim as new and desire to secure by Letters Patent of the United States, is,—

1. The method of braking electrically in systems employing a plurality of motors of the commutator type adapted to drive a common load, which consists in operating a portion of the motors as separately excited generators driven by the load, and operating other of said motors as generators driven by the load and excited differentially by current generated in the first-named portion of the motors and by the current generated by said other of the motors.

2. The method of braking electrically in systems employing a plurality of motors of the commutator type adapted to drive a common load, which consists in operating a portion of the motors as generators driven by the load and excited from the source of current supply, and operating other of said motors as generators driven by the load to return power to said source, the latter portion of the motors being excited differentially by the current generated in the first-mentioned motors and by the current returned to the source.

3. The method of braking electrically in systems employing a plurality of motors of the commutator type adapted to drive a common load, which consists in operating one of the motors as a generator driven by the load and excited from the source of current, supplying current from its armature to excite another motor, returning current from the armature of the other motor to the source, and superposing on the excitation of said other motor an opposing excitation proportional to the current returned to the source.

4. The method of braking electrically in systems employing a plurality of motors of the commutator type adapted to drive a common load, which consists in operating one of the motors as a generator driven by the load and excited from the source of current, supplying current from its armature to excite another motor, returning current from the armature of the other motor to the source, superposing on the excitation of said other motor an opposing excitation proportional to the current returned to the source, and varying the field-strength of the first-mentioned motor.

5. The method of braking electrically in systems employing a plurality of motors of the commutator type adapted to drive a common load and supplied from an alternating-current source through a transformer, which consists in operating one of the motors as a generator driven by the load, and excited from said source, supplying current from its armature to excite another motor, returning current from the armature of the other motor to the source through the transformer, superposing on the excitation of said other motor an opposing excitation proportional to the current returned to the source, and varying the points of connection of said other motor to the transformer.

6. The method of braking electrically in systems employing a plurality of motors of the commutator type adapted to drive a common load and supplied from an alternating-current source through a transformer, which consists in operating one of the motors as a generator driven by the load and excited from said source, supplying current from its armature to excite another motor, returning current from the armature of the other motor to the source through the transformer, superposing on the excitation of said other motor an opposing excitation proportional to the current returned to the source, and varying the effective ratio of transformation of said transformer.

7. The method of braking electrically in systems employing a plurality of motors of the commutator type adapted to drive a common load, which consists in operating one of the motors as a separately-excited generator, supplying current from its armature to excite another motor, and operating the latter motor as a braking generator driven by the load to return energy to the source with its exciting winding included at least in part in its armature circuit.

8. The method of braking electrically in systems employing a plurality of alternating-current motors of the commutator type adapted to drive a common load, which consists in operating one of the motors as a generator driven by the load and excited by a voltage impressed on its exciting winding substantially in phase with the voltage of the source so as to produce an induced armature voltage substantially in quadrature with the voltage of the source, impressing said induced armature voltage on the exciting winding of another motor so as to produce therein an induced armature voltage substantially in phase with the voltage of the source, and connecting the armature of the other motor to the source through a part at least of its exciting winding, the presence of said exciting winding in the armature circuit serving to produce a small phase displacement between the voltage at the terminals of the motor circuit and the voltage of the source.

9. The method of braking electrically in systems employing a plurality of alternating-current motors of the commutator type adapted to drive a common load, which consists in operating one of the motors as a generator driven by the load and excited by a voltage impressed on its exciting winding substantially in phase with the voltage of the source so as to produce an induced armature voltage substantially in quadrature with the voltage of the source, impressing said induced armature voltage on the exciting winding of another motor so as to produce therein an induced armature voltage substantially in phase with the voltage of the source, and connecting the armature of the other motor to the source through connections including means adapted to produce a small phase displacement between the voltage at the terminals of the motor circuit and the voltage of the source.

10. The method of braking electrically in systems employing a plurality of alternating-current motors of the commutator type adapted to drive a common load, which consists in operating one of the motors as a generator driven by the load and excited by a voltage impressed on its exciting winding substantially in phase with the voltage of the source so as to produce an induced armature voltage substantially in quadrature with the voltage of the source, impressing said induced armature voltage on the exciting winding of another motor so as to produce therein an induced armature voltage substantially in phase with the voltage of the source, and connecting the armature of the other motor to the source through a part at least of a winding which is in circuit with the armature of the first-mentioned motor.

11. In combination with a plurality of motors of the commutator type adapted to drive a common load, a source of current therefor, and means for controlling the motors for electric braking, comprising connections for separately exciting one of said motors, means for connecting the armature of said motor to the exciting winding of another motor, and means for connecting the armature winding of the other motor to the source through a part at least of its exciting winding.

12. In combination with a plurality of motors of the commutator type adapted to drive a common load, a source of current therefor, and means for controlling the motors for electric braking, comprising connections for separately exciting one of said motors, means for connecting the armature of said motor to the exciting winding of another motor, means for connecting the armature winding of the other motor to the source through a part at least of its exciting winding, and means for varying the field-strength of the first-mentioned motor.

13. In combination with a plurality of alternating-current motors of the commutator type adapted to drive a common load, a transformer for supplying current to said motors, and means for controlling the motors for braking electrically, comprising connections for separately exciting one of said motors, means for connecting the armature of said motor to the exciting winding of the other motor, and means for connecting the armature winding of the other motor to the transformer through part at least of its exciting winding.

14. In combination with a plurality of alternating-current motors of the commutator type adapted to drive a common load, a transformer for supplying current to said motors, and means for controlling the motors for braking electrically, comprising connections for separately exciting one of said motors, means for connecting the armature of said motor to the exciting winding of the other motor, means for connecting the armature winding of the other motor to the transformer through a part at least of its exciting winding, and means for varying the points of connection to said transformer.

15. In combination with a plurality of motors of the commutator type adapted to drive a common load, a source of current therefor, and means for controlling the motors for electric braking, comprising connections for separately exciting one of the motors, means for connecting the armature of said motor to the exciting winding of the other motor, an impedance arranged to be connected in parallel with said exciting winding, and connections from the armature of the latter motor to the source including a portion of the parallel circuit formed by said exciting winding and impedance.

16. In combination with a plurality of alternating-current motors of the commutator type adapted to drive a common load, a source of current therefor, and means for controlling the motors for electric braking, comprising connections for separately exciting one of the motors, means for connecting the armature of said motor to the exciting winding of another motor, a compensator connected in parallel with said exciting winding, and connections from the armature of the latter motor to the source including a portion of said compensator whereby said exciting winding is in effect partly included in the armature circuit.

In witness whereof, I have hereunto set my hand this 17th day of February, 1908

ERNST F. W. ALEXANDERSON.

Witnesses:
BENJAMIN B. HULL,
HELEN ORFORD.